May 25, 1926.

A. J. OTTO ET AL 1,585,732

VALVE

Filed March 17, 1922      2 Sheets-Sheet 1

Inventors
Arthur J. Otto,
Charles L. Fortier,
By Dodge and Dros
Attorneys

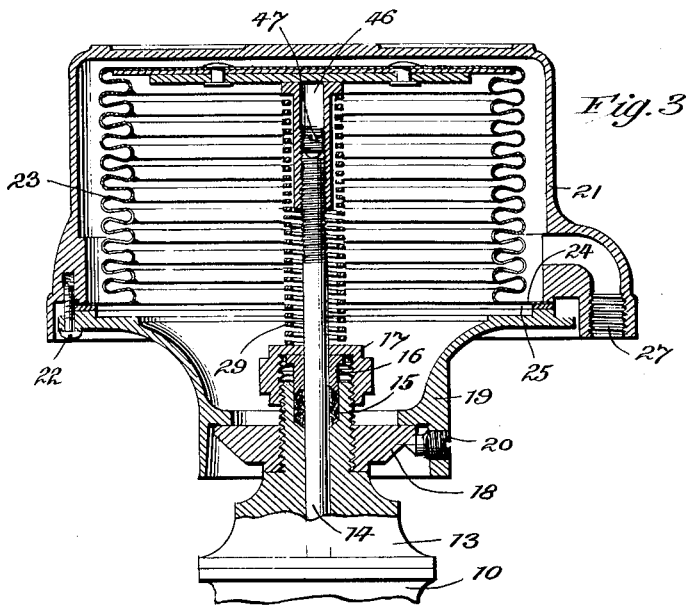
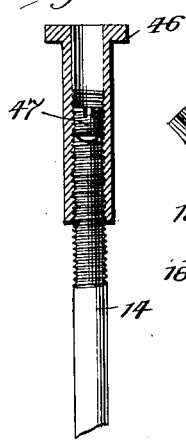
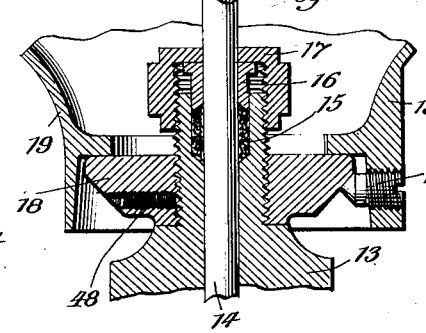
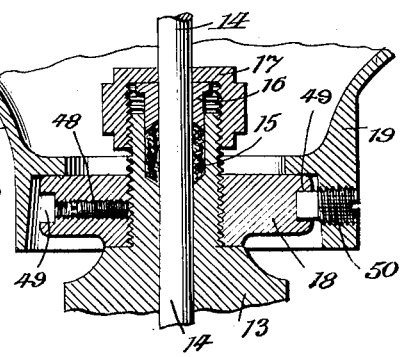
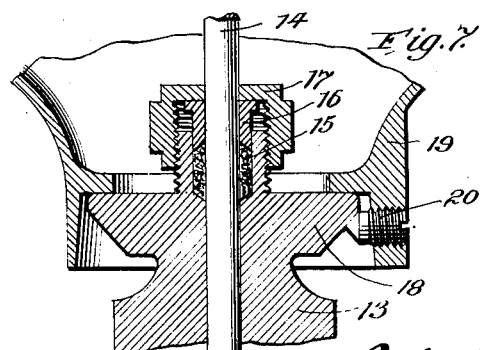

Patented May 25, 1926.

1,585,732

UNITED STATES PATENT OFFICE.

ARTHUR J. OTTO AND CHARLES L. FORTIER, OF MILWAUKEE, WISCONSIN.

VALVE.

Application filed March 17, 1922. Serial No. 544,533.

This invention relates to valves, and particularly to valves operated by diaphragm motors such as are commonly used in automatically controlled heating systems to admit or cut off steam to and from radiators.

Heretofore flexible rubber diaphragms have been extensively used in such valve motors, but the present tendency is toward the uniform adoption of corrugated metallic bellows in place of such rubber diaphragms.

An important object of the invention is to provide a motor of the metal bellows type which is simple to construct and which may be conveniently mounted on or dismounted from the valve structure proper.

Another feature of substantial importance is the construction of the motor in such manner that it may, by the use of very simple adapters, be applied to old valves of the rubber diaphragm type in lieu of the rubber diaphragm motor, while the valve is in use.

The accompanying drawings illustrate a preferred embodiment of the invention and also its application to valves of the old type.

In the drawings:—

Fig. 3 is a fragmentary view similar to Fig. 1 illustrating the mode of applying the motor structure of Fig. 1 to the valve structure of Fig. 2;

Fig. 4 is a fragmentary view showing on an enlarged scale the means used for lengthening the valve stem to cause it to co-act properly with the metal diaphragm motor;

Fig. 5 is a fragmentary view showing a modified form of motor mount for use in equipping the valves of Fig. 2 with metal diaphragm motors;

Fig. 6 shows another modified form of motor mount; and

Fig. 7 illustrates a further modified construction applicable to the valve illustrated in Fig. 1, in which the motor mount is integral with the center piece of the valve.

Figure 1:
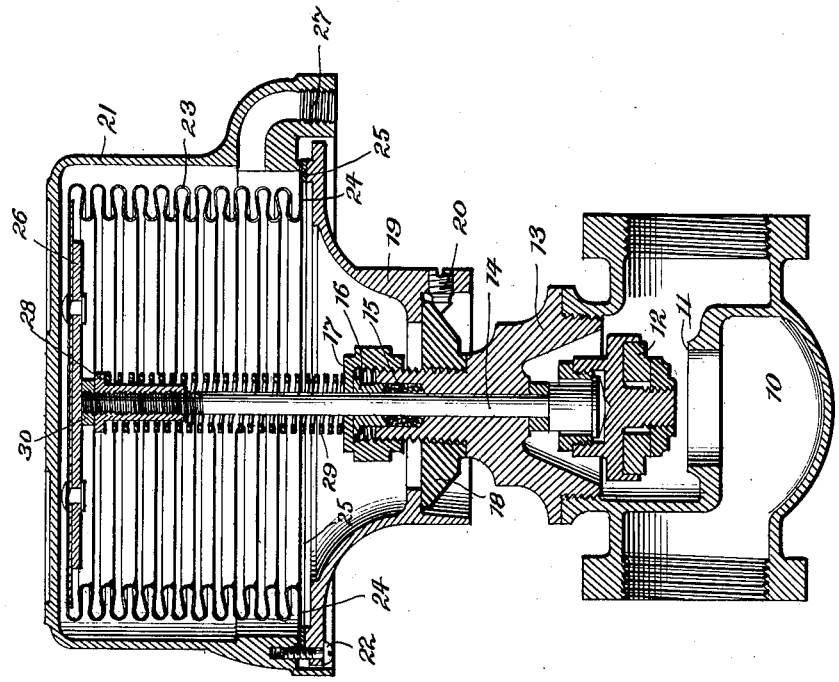
Fig. 1 is a vertical section of the improved valve.

Referring first to Fig. 1, 10 is the valve body; 11 is the valve seat; 12 is the valve; and 13 is the center piece through which the valve stem 14 is guided. The stem is packed in the usual manner, the packing being shown at 15, the gland at 16, and the gland nut at 17.

The threads which receive the gland nut 17 are continued below the nut, and receive a motor mount 18 which is in the shape of a frustum of a cone screwed onto the threads above mentioned, and turned to seat firmly against a shoulder formed on the center piece 13. If preferred, the motor mount 18 may be formed integrally with the center piece 13, as is illustrated in Fig. 7. The equivalence of the two structures, so far as new valves are concerned, is obvious.

Seated on the upper face of the motor mount 18 is the motor base 19, commonly called a spider, though, in this case, it is preferably formed as a cup-shaped casting. Its exact form is not material, except that it is provided with a depending skirt which surrounds the motor mount 18 and receives a plurality of conically pointed screws 20 which engage the conical face of the motor mount 18 and retain the motor base 19 firmly thereon in any desired angular position.

The motor top or housing 21 is clamped to the periphery of the motor base or spider 19 by a plurality of screws 22 which pass through the rim of the spider and are threaded into the motor top, as is clearly shown in Fig. 1.

The metal bellows 23, which are housed within the motor top 21, have an outwardly extending flange 24 which, together with a gasket 25, is clamped by the screws 22 between the rim of the spider 19 and the motor top 21. The bellows 23 are closed at the upper end by a reinforced top 26, and are subjected to pressure tending to depress the bellows and admitted through the air inlet 27.

Threaded on the upper end of the rod 14 is a spring seat 28. A spring 29 is confined between the flange on spring seat 28 and gland nut 17 and acts to urge the valve stem 14 in a direction to open the valve 12. The spring seat 28 is locked in position by the valve stem nut 30 which is threaded on the valve stem 14 above the spring seat 28. When pressure fluid is admitted through the air inlet 27, the effect is to force down the valve stem 14 against the action of spring 29 to close the valve 12 against its seat 11. When pressure fluid is exhausted through the air inlet 27, the spring 29 acts to open the valve 12.

Figure 2:
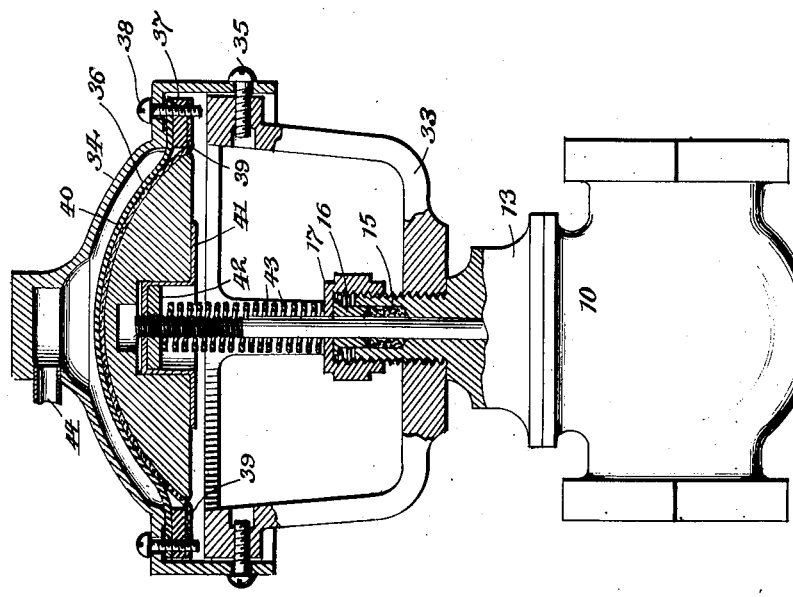
Fig. 2 is a similar view, partly in elevation and partly in section, showing a valve of the old type equipped with a rubber diaphragm motor.

Referring now to Fig. 2, the construction of a common type of rubber diaphragm motor valve will be explained. The valve structure includes parts similar to those numbered 10 to 17 in Fig. 1, and these parts are similarly numbered where visible in Fig. 2. The dimensions may or may not vary, but, as a rule, the valve stem is too short to be actuated by a metallic bellows of sufficient range of action unless the valve stem be lengthened. The reason for this is the fact that the compressive movements of metallic bellows are limited by the collision of the successive convolutions, so that the corrugated metal bellows must have considerable length to offer the same range of movement as is offered by a rubber diaphragm of the same diameter.

In the valve of Fig. 2, nothing corresponding to the motor mount 18 of Fig. 1 is used, but, instead, the spider 33 is threaded directly on the threads which receive the gland nut 17, and is screwed down against the shoulder on the center piece 13. A motor top 34 is attached to the spider 33 by means of screws 35 and carries a diaphragm 36 which is clamped to the rim of the top 34 by a diaphragm clamping ring 37 held by the clamp screws 38.

A felt covering 39 is mounted below the diaphragm 36 and bears directly upon the so-called saucer or thrust member 40, which is commonly formed of wood. This saucer 40 is provided with a metallic insert or abutment 41 which bears directly against the stem adjusting nut 42 threaded on the valve stem 14. A spring 43 is confined between the adjusting nut 42 and the gland nut 17. The air inlet is shown at 44 and pressure fluid acts on the top of the diaphragm 36 to close the valve in opposition to the opening tendency of the spring 43.

To apply the metal bellows motor to the valve structure of Fig. 2, in lieu of the rubber diaphragm motor, the pipe connection to port 44 is broken; the screws 35 are removed; and the motor top 34 is lifted off. This permits the removal of the saucer 40 with its insert 41, after which the nut 42 is turned off the stem 14, releasing the spring 43. Removal of the gland nut 17 then permits the spider 33 to be screwed off the center piece 13.

Refer now to Fig. 3. The old motor being thus dismounted, the first step is to screw a special motor mount 18 into place in lieu of the spider 33. In its outer configuration, this motor mount is identical with the part similarly numbered in Fig. 1, but is threaded to fit the threads on the center piece 13 of the valve shown in Figs. 2 and 3. If the threads on the center piece 13 are badly worn, the set screw 48 (such as is shown in Fig. 5) may be used to lock the motor mount 18 in position.

The gland nut 17 is now replaced, and the spring 29 put in position. It is held by a spring seat 46 which may conveniently be made longer than the spring seat 28 shown in Fig. 1, and which thus serves as an extension for the valve rod 14. The extension is so mounted on the rod 14 that, when the valve is fully open, it stands in the proper position to engage the bellows of the motor in fully extended position. The proper length can be determined by measuring the distance from the upper face of the mount 18 to the top of the spring seat 46. When the spring seat 46 is in proper position, it may be locked by the special locking screw 47 which is threaded from the top into the spring seat 46, and which engages the end of the valve stem 14.

The motor structure, consisting of the motor base 19, motor top 21, diaphragm 23 and their connected parts, all assembled as above described, may now be set in position and locked on the motor mount 18 by setting up the screws 20. When this has been done, the air connection is made at 27 and the conversion of the valve is complete.

While the type of motor mount 18, shown in Figs. 1, 3 and 5, is preferred, because of its simplicity of manufacture and the ease with which tight clamping of the motor can be secured, other slightly different arrangements are possible, and one of these is illustrated in Fig. 6, in which the mount 18 is formed with a peripheral groove 49. When this modified mount 18 is used, a different type of locking screw, indicated by the numeral 50, is necessary in lieu of the cone-pointed screws 20. The screws 50 are provided merely with a cylindrical clamping end which enters the groove 49.

The construction shown in Fig. 6 is more expensive to manufacture, and does not have any wedging clamping action, but has the advantage, also possessed by the preferred construction, of allowing the motor base 19 to be adjusted angularly by a vertical axis on the mount 18.

The invention offers a type of motor-actuated valve (see Fig. 1) which is neat in appearance and simple to manufacture. It possesses the additional advantages that the motor element may readily be detached from the valve element while the valve is under pressure, and that the motor element may be clamped on the valve element in various angular relations.

Furthermore, the motor is applicable to old motor valves in lieu of obsolescent types of motor, and this application requires only three special parts, each of which is of simple and inexpensive construction, namely, the mount 18, the special spring seat 46 and the special locking screw 47. In many cases, the regular spring seat 28 is sufficiently long and properly threaded, and can be used, and similarly the mount 18 may be properly threaded for use on the old valve. In any event, the special parts are of utmost simplicity and are adapted to quantity production on an economical basis.

What is claimed is:—

1. The combination of a valve having a stem; a motor mount carried by said valve and having a conical wedging surface; a motor supported by said mount and including a metallic bellows diaphragm serving to actuate said stem; and a clamping screw adapted to engage the conical surface of said mount and serving thereby to draw said motor tightly into contact with said mount, in any desired angular position.

2. The combination of a valve having a stem; a frusto-conical motor mount threaded on said valve; a motor supported by said mount, said motor including a skirt surrounding said mount, and a metallic bellows diaphragm adapted to actuate said stem; and a plurality of clamping screws threaded in said skirt and engaging the conical surface of said mount.

3. The combination of a valve having a stem; a frusto-conical motor mount threaded on said valve; a set screw for locking said mount in position; a motor supported by said mount, said motor including a skirt surrounding said mount, and a metallic bellows diaphragm adapted to actuate said stem; and a plurality of clamping screws threaded in said skirt and engaging the conical surface of said mount.

4. The combination of a valve having a body, a movable stem projecting therefrom and a gland and gland nut sealing the joint between said body and stem; a mount carried by said body below said gland nut, said mount being larger at its periphery than said nut and having a reduced portion below its top; an actuating unit resting on said mount, said unit including a skirt surrounding said mount and a diaphragm motor adapted to actuate said stem; and clamping means engaging said skirt and the reduced portion of said mount and serving to clamp the same together in any desired angular relation.

5. A motor unit applicable to diaphragm operated valves having a threaded center piece and a threaded valve stem, comprising in combination a frusto-conical motor mount adapted to be screwed onto said center piece; a diaphragm motor supported on said mount; screws threaded in said motor and engaging the conical portion of said mount to draw the motor firmly against said mount; an internally threaded extension adapted to be screwed on said threaded stem and to enter into coactive relation with said diaphragm motor; and a locking member screwed into said extension and engaging said stem to lock the two together.

In testimony whereof we have signed our names to this specification.

ARTHUR J. OTTO.
CHARLES L. FORTIER.